United States Patent
Schmidt

(10) Patent No.: US 11,118,522 B2
(45) Date of Patent: Sep. 14, 2021

(54) CRANK DRIVE CONDITION MONITORING FOR AN INTERNAL COMBUSTION ENGINE

(71) Applicant: MAN Truck & Bus AG, München (DE)

(72) Inventor: Christopher Schmidt, Fürth (DE)

(73) Assignee: MAN TRUCK & BUS AG, Munich (DE)

(*) Notice: Subject to any disclaimer, the term of this patent is extended or adjusted under 35 U.S.C. 154(b) by 302 days.

(21) Appl. No.: 16/260,374

(22) Filed: Jan. 29, 2019

(65) Prior Publication Data
US 2019/0234324 A1    Aug. 1, 2019

(30) Foreign Application Priority Data
Jan. 29, 2018 (DE) .................... 10 2018 101 940.8

(51) Int. Cl.
*F02D 41/00* (2006.01)
*G01M 13/02* (2019.01)
*G01M 15/06* (2006.01)

(52) U.S. Cl.
CPC .......... *F02D 41/009* (2013.01); *G01M 13/02* (2013.01); *G01M 15/06* (2013.01); *F02D 2200/101* (2013.01); *F02D 2200/1015* (2013.01)

(58) Field of Classification Search
CPC ............. F02D 41/009; F02D 2200/101; F02D 2200/1015; G01M 13/02; G01M 15/06
See application file for complete search history.

(56) References Cited

U.S. PATENT DOCUMENTS

| 5,269,178 A | 12/1993 | Vigmostad et al. |
| 5,511,422 A | 4/1996 | Hernandez |

(Continued)

FOREIGN PATENT DOCUMENTS

| DE | 19545008 A1 | 6/1997 |
| EP | 2498076 A1 | 9/2012 |

OTHER PUBLICATIONS

Search Report for parent German Patent Application DE 10 2018 101 940.8 dated Sep. 24, 2018.

*Primary Examiner* — Freddie Kirkland, III
(74) *Attorney, Agent, or Firm* — Weber Rosselli & Cannon LLP

(57) ABSTRACT

A method for detecting a change in the operating behaviour of a crank drive of a motor vehicle such as cracks in the crank drive or for detecting bearing wear. The crank drive includes a crankshaft, a pulse generator generating a signal S dependent on the rotational speed of the pulse generator and the distance of the pulse generator away from the sensor device. The method includes steps of detection of a current signal $S_{cur}$ of the sensor device during the operation and comparing the current signal $S_{cur}$ with a reference signal $S_{ref}$ stored in a memory and detecting a change in the operating behaviour of the crank drive such as cracks in the crank drive or bearing wear, from the comparison of the current signal $S_{cur}$ with the reference signal $S_{ref}$.

19 Claims, 5 Drawing Sheets

(56) References Cited

U.S. PATENT DOCUMENTS

| | | | |
|---|---|---|---|
| 6,389,887 B1* | 5/2002 | Dusserre-Telmon | ........................ G01H 1/003 73/114.77 |
| 8,935,041 B2* | 1/2015 | Hagel | ................... F16F 15/002 701/32.1 |
| 9,032,803 B2* | 5/2015 | Griffaton | ............ G01M 13/045 73/659 |
| 9,915,585 B2* | 3/2018 | Pettersson | ............. G01M 13/04 |
| 2013/0197740 A1 | 8/2013 | Hagel et al. | |

* cited by examiner

CRANK DRIVE CONDITION MONITORING FOR AN INTERNAL COMBUSTION ENGINE

BACKGROUND

The disclosure relates to a method for detecting a change in the operating behaviour of a crank drive of a motor vehicle, in particular, for detecting cracks in the crank drive or for detecting bearing wear. Furthermore, the disclosure relates to a vehicle, in particular, a utility vehicle, comprising a control device, which is set up to carry out such a method.

During operation of the internal combustion engine in the motor vehicle, the crank drive, in particular, the crankshaft, is subject to high bending and torsion loads. Furthermore, the components and bearings are stressed by torsional vibrations, which result from the constant intermittent acceleration and deceleration of the rotational movement of the crank drive. In order to prevent a failure of the vehicle due to engine damage, it is desirable to detect wear of the crank drive, in particular, cracks, changes in the concentricity or the installation position as early as possible.

From DE 195 45 008 A1, for the early detection of changes in the periodically operating machinery, it is known to process a machine-specific measured signal, for example, the rotational speed signal, in an evaluation unit by means of an order analysis. Thereby, the measured signal is converted by means of Fourier transformation into a spectrum consisting of a plurality of frequencies and the amplitude deviation of selected frequencies from a reference spectrum identified during a fault-free operating state is analysed. From this comparison, any existing fault or error states of the machine can be concluded. However, it is disadvantageous that the recorded measured signals must be extensively reprocessed for this. In addition, by means of this method, above all, changes in the vibrational behaviour and fewer positional changes of the components are detected.

SUMMARY

The object of the disclosure is therefore to provide a method, which is improved in comparison to the most recent background art, for detecting changes in the operating behaviour of a crank drive of a motor vehicle, in particular, for detecting cracks in the crank drive or for detecting bearing wear. In particular, the object of the disclosure is to provide a simpler-toimplement method for crank drive monitoring, which requires fewer calculation operations.

These tasks are achieved by means of a method with the features of the independent claim. Favourable embodiments and applications of the disclosure result from the dependent claims and are explained in more detail in the following description, partly taking the figures into account.

One aspect of the disclosure is to use the "raw signal" of the sensor device of a magnetic tachometer, which is available in most motor vehicles, in order to monitor the crank drive. Usually, the sensor device is used to detect the rotational speed of the crank drive by means of evaluating the regular magnetic flux alteration by means of a pulse generator, for example, a perforated disc attached to the flywheel. According to the disclosure, however, the rawsignal amplitude of the sensor device can also be used to detect deviations of the flywheel or of the pulse generator from its target position. Since the signal amplitude of the sensor device reacts sensitively to positional changes, particularly to changes of the radial and axial distance between the pulse generator and the sensor device, a main and a flange bearing wear or a crack in the crank drive can be detected from the comparison with a reference signal of the intact crank drive. In order to better detect such changes in the operating behaviour of the crank drive, the basic idea of the disclosure also additionally comprises the aspect of a slight signal processing of the raw signal in the form of a time averaging and/or a filtering. However, this only occurs to the extent that the information on the distance between the pulse generator and the sensor device continues to also be coded in the signal after signal processing.

According to the disclosure, a method for detecting a change in the operating behaviour of a crank drive of a motor vehicle, in particular, for detecting cracks in the crank drive or for detecting bearing wear is provided. The manner in which a crank drive operates under specified conditions (e.g. rotational speed) can be understood as operating behaviour which, in particular, comprises the rotational-speed-dependent vibrational, positional and resonance behaviour of a crank drive with, for example, a crankshaft, bearing connecting rods, pistons, rings, bolts, vibration dampers and flywheels. Furthermore, the crank drive comprises a crankshaft, a pulse generator rotating during operation of the crankshaft and a stationary magnetic sensor device, which generates a signal S dependent on the rotational speed of the pulse generator and the distance of the pulse generator away from the sensor device, wherein the signal S can be dependent on the radial and/or axial distance (with reference to the rotational axis of the crankshaft) of the pulse generator away from the sensor device. In one aspect, it has to do with an induced voltage signal.

Pulse generators as well as magnetic sensors are known in the most recent background art. In this way, inductive, oscillatory-inductive, magneto-resistive eddy current sensors and Hall-effect sensors can be used as magnetic sensors for the method according to what is claimed, which are all based on a contactless detection of a change of the magnetic flux at the location of the sensor device by means of the movement of the pulse generator. The pulse generator has the task of influencing the magnetic sensor during operation of the crank drive and, for example, can be designed as a toothed gear, a sensor wheel or a perforated disc. However, any other structures may be used which rotate at a fixed ratio to the crankshaft and can also and at least portionally have a region, in particular, along its circumference, which is in the shape of a hole, a projection, a groove or a region with a varying magnetization. If these structures are led past the sensor device, the magnetic flux on the location of the sensor device can be changed in this way and a signal S can be generated, which depends on the speed at which the structure is passed by the sensor device and the distance of this structure away from the sensor device. If it is provided to detect both information on the axial as well as the radial distance component between the sensor and the pulse generator, this can, however, necessitate the use of special geometries of the pulse generator depending on the installation position of the sensor device. For example, in the case of a radial installation position of the sensor device, a pulse generator with an axial construction is required, for example, in the shape of a hole track to detect axial positional changes in the crank drive.

In accordance with a first general aspect of the disclosure, the method comprises the following steps:

During operation of the crank drive, a current signal $S_{cur}$ of the sensor device is detected, for example with a high scanning rate, wherein a measurement for the current, for example average distance between the pulse generator and the sensor device can be derived from the current signal $S_{cur}$ of the sensor device. For example, the analogue voltage signal induced in the sensor device can be used, the amplitude of which correlates to the pulse-generator sensor distance. This current signal $S_{cur}$ is compared with a reference signal $S_{ref}$ of the sensor device stored in a memory, which has been determined in a reference state of the crank drive, and a change in the operating behaviour of the crank drive, in particular, cracks in the crank drive or bearing wear, are detected from the comparison of the current signal $S_{cur}$ with the reference signal $S_{ref}$. Thereby, both $S_{cur}$ as well as $S_{ref}$ can comprise a plurality of signal values of an information-conveying factor. $S_{cur}$ and $S_{ref}$ can comprise analogue or digital signal values. $S_{cur}$ and $S_{ref}$ can be a function of the time and/or the rotational speed of the crankshaft and/or another physical factor. The reference state can be a state characterized by a certain operating state of the crank drive, which is characterized by the vibrational and/or positional and/or resonance behaviour of the crank drive dependent on the installation position and the rotational speed. For example, the reference state can have to do with an intact crank drive; as an alternative, however, also a certain fault of the crank drive, for example, a crankshaft with a crack, can be used for a specific fault diagnosis. By determining the reference signal $S_{ref}$ in a reference state of the crank drive, the distance between the pulse generator and the stationary sensor, which is dependent on the rotational speed and the vibrations of the crank drive can be coded in $S_{ref}$. If changes to the crank drive occur during the further operation, this can result in a changed vibrational, positional and resonance behaviour of the crank drive, which, in turn, can result in a changed rotational-speed-dependent average distance between the pulse generator and the sensor and therefore, in a changed sensor signal S. The comparison of the current signal $S_{cur}$ with the reference signal $S_{ref}$ therefore corresponds primarily to a check of the current rotational-speed-dependent distance between the sensor device and the pulse generator with their rotational-speed-dependent distance in the reference state. Due to the comparison of the current signal $S_{cur}$ with the reference signal $S_{ref}$, in this way, also small changes in the crank drive, in particular, changes in the distance between the sensor device and the pulse generator, can be sensitively detected. The comparison of the signals can occur by means of forming a difference or a quotient or another method known from the field of signal evaluation.

The method is described specifically for detecting changes in the operating behaviour of a crank drive, however, the principle can also be used for detecting changes in the operating behaviour of the cam-, drive- or any other shaft if the pulse generator is correspondingly coupled to the cam-, drive- or any other shaft. The particular advantage when monitoring the crank drive lies in the fact that, for most motor vehicles, such an arrangement of individual components, meaning a pulse generator and a sensor device, is already available on the crank drive for measuring rotational speed.

According to an embodiment of the disclosure, in the case of the signal S generated by the sensor device, it has to do with a voltage signal, for example, an analogue voltage signal. In particular, in the case of the voltage signal, it can have to do with a voltage signal induced there due to the magnetic flux at the sensor device that varies due to the movement of the pulse generator. On this, it is favourable that no other signal processing or signal conversion must take place and, thereby, the "raw signal" of the sensor, in which the information on the sensor-pulse generator distance is coded, can be used directly for crank drive monitoring. In particular, in the case of the voltage signal, it does not exactly have to do with a rotational-speed signal, which would result from the evaluation of the number of the signal impulses per time unit generated by the rotating pulse generator.

A further development of the design provides that, in order to compare the signals, a time-averaged maximal voltage signal or a time-averaged value of the voltage signal is determined from the detected current signal $S_{cur}$ of the sensor device. In particular, a positive maximum voltage amplitude or a negative maximum voltage amplitude can be determined from the detected current signal $S_{cur}$ of the sensor device. This is an advantage since an almost stationary effective value can be determined due to the time averaging of the oscillating voltage amplitude based on the rotation movement of the pulse generator, which represents a better comparative value than the fluctuating raw signal. In addition, also signal fluctuations can be averaged out due to vibrations of the crank drive/pulse generator, whereby, in turn, a more reliable comparison is possible. If a time-averaged maximal voltage signal or a time-averaged value of the voltage signal is determined from the detected current signal $S_{cur}$ of the sensor device. The reference signal may also be subjected to the same signal processing for the signal comparison.

According to one embodiment of the disclosure, the detected current signal $S_{cur}$ of the sensor device is subjected to a filtering to compare the signals. For example, this can take place in the form of a low pass and/or order filtering. The filtering may take place in such a way that the high-frequency signal components of the individual teeth and/or holes of the rotating pulse generator, which are for example often made with a 60-point scale for determining the rotational speed, are eliminated and only the low-frequency signal components, which show positional deviations (e.g. wobbling) of the crank drive, are detected. The advantage of this is that positional deviations of the crank drive can be more reliably and more precisely detected in this way. However, it is crucial to the method that the filtering only takes place in such a way that a measurement for the current average distance between the pulse generator and the sensor device can be derived from the current signal $S_{cur}$ even after filtering, meaning the distance information to be detected also continues to be coded in the signal. If the detected current signal $S_{cur}$ of the sensor device is subjected to a filtering, in one aspect the the reference signal is subjected to the same filtering for the signal comparison.

According to an aspect of the disclosure, based on the comparison of the current signal $S_{cur}$ with the reference signal $S_{ref}$, a deviation of the current distance between the pulse generator and the sensor device from a distance between the pulse generator and the sensor device in a reference state of the crank drive can be specifically detected. In one aspect, it has to do with an average distance. The detection of a deviation is possible since, the distance between the pulse generator and sensor device, for example, in the form a voltage amplitude, is coded in the signal S generated by the sensor device and thereby, a change of the distance of these components can be derived from the change of the signal S.

According to another aspect of the disclosure, based on the comparison of the current signal $S_{cur}$ with the reference signal $S_{ref}$, a crack in the crank drive or bearing wear can be specifically detected.

In accordance with another embodiment, additionally, a rotational speed of the crankshaft is determined from the detected current signal $S_{cur}$ of the sensor device. By means of this, the magnetic sensor device can assume a dual function. On the one hand, possible changes in the operating behaviour of the crank drive can be concluded via the signal detected by it, on the other hand, the sensor device can be used as a tachometer. This has the advantage that installation space can be saved by using only a single device that fulfils both functions. In addition, the method can be upgraded without large reconstruction measures in the case of vehicles without a crank drive monitoring system since only a modification is required on the tachometer, which is mostly present in any case. Thereby, it must be mentioned again that, in the case of the detected current signal $S_{cur}$ of the sensor device, which is used by the claimed method to detect changes in the operating behaviour of the crank drive, it can have to do with a type of "raw signal" of the sensor device, in particular, with a voltage signal, from which, however, information can also be determined via the rotational speed. For example, it can have to do with a voltage regularly induced by the movement of the pulse generator. In order to monitor the crank drive, for this purpose, the signal amplitude of the voltage signal, which is particularly sensitive to the distance between the sensor device and the pulse generator and thereby, to the rotational-speed-dependent vibrational, positional, and resonance behaviour of the crank drive, can be used while a rotational-speed signal is determined from the voltage pulses induced by the pulse generator detected per time unit.

According to an embodiment of the disclosure, the reference signal $S_{ref}$ of the sensor device is stored in the memory as a function of the rotational speed of the crankshaft and/or the torque of the crankshaft. Thereby, the reference signal $S_{ref}$ can be stored for discrete rotational speed values and/or torque values. The reference signal $S_{ref}$ can be stored in the memory for a certain rotational-speed range or a plurality of rotational-speed ranges and/or a certain torque range or a plurality of torque ranges. In particular, $S_{ref}$ can be stored for rotational speeds within a range of 0 to a maximum of 10 000 rpm. Here, in this embodiment, the comparison occurs by means of comparing a signal value of the current signal $S_{cur}$, which has been determined at a certain rotational speed and/or torque of the crankshaft with a reference signal value of the corresponding rotational speed and/or of the corresponding torque. For example, a rotational speed of the crankshaft can be determined from the current signal $S_{cur}$ for each signal value of the current signal $S_{cur}$, where this signal value was detected, and compared with a reference signal value belonging to this rotational-speed value. For this purpose, a clear allocation between a rotational speed value and/or a torque value and a reference signal value can be stored in the memory. If the current signal $S_{cur}$ was furthermore subjected to a signal processing for the comparison, in particular, subjected to a time averaging, in this way, the reference signal or the reference signal values also can be subjected or have been subjected to an appropriately corresponding signal processing in order to ensure the comparability of the signals.

A further development of the design provides that the current signal $S_{cur}$ of the sensor device is determined as a function of the rotational speed of the crankshaft and/or of the torque of the crankshaft. Thereby, this can take place for certain discrete rotational speed values and/or torque values. The detection of the current signal $S_{cur}$ of the sensor device can take place for a certain rotational speed range or a plurality of rotational speed ranges and/or a certain torque range or a plurality of torque ranges. In particular, this can take place for rotational speeds within a range of 0 to a maximum of 10 000 rpm. Since the effects of possible changes in the operating behaviour of the crank drive are noticeable at varying levels in the case of different rotational speeds due to the resonance effects, the detection of a plurality of signals can increase the reliability and precision in the case of different rotational speeds, with which changes to the crank drive can be detected. The detection of the current signal $S_{cur}$ of the sensor device as a function of the rotational speed and/or the crankshaft can take place successively for various rotational speeds and/or torques. That means that the current signal $S_{cur}$ of the sensor device is initially detected for only one rotational speed and/or one torque, compared to the reference signal corresponding to this rotational speed and/or torque and a possible change in the operating behaviour of the crank drive is detected and then the method is repeated again for another rotational speed and/or another torque. As an alternative, the current signal $S_{cur}$ can initially also be detected for a plurality of rotational speed values and/or torque values and then the other method steps can be carried out using this signal.

According to an embodiment of the disclosure, the comparison of the current signal $S_{cur}$ of the sensor device with the reference signal $S_{ref}$ of the sensor device stored in the memory takes place by means of formation of a difference according to the value of both signals $\Delta S=|S_{cur}-S_{ref}|$. If the difference according to the value of both signals $\Delta S$ exceeds a first threshold value $TV_1$, a first notification is output. The first threshold value can be specified as fixed or be variable. For example, the first threshold value can be specified by the manufacturer for a certain combination consisting of a sensor device and a pulse generator and/or for a certain crankshaft type. The first notification can comprise an optical and/or an acoustical signal. The first notification can additionally temporally last until the change in the operating behaviour of the crank drive has been remedied or occur at regular limited time intervals. The first notification can also occur in electronic form, for example, as a digital entry in a fault memory of the motor vehicle. The first notification can additionally give an indication that a fault of the crank drive is present, in particular, a crack in the crank drive or bearing wear. The first notification can give an indication that such a fault is on the verge of occurring, however, no immediate repair of the crank drive is required. The first notification can also give an indication that an immediate repair of the crank drive is required. As an alternative, the first notification can also be output if the difference according to the value of both signals $\Delta S=|S_{cur}-S_{ref}|$ exceeds the first threshold value $TV_1$. This can, above all, be the case if it has to do with a certain fault in the case of the reference state and a notification should be output if this occurs. This method is favourable due to the fact that the formation of the difference according to the value of the signals and the subsequent comparison can be realized in a simple manner both on a software as well as a hardware level.

In accordance with a further development, a second notification is output if the difference of both signals $\Delta S$ according to the value exceeds a second threshold value $TV_2$, wherein $TV_2 > TV_1$ applies. Analogously to the first threshold value, also the second threshold value can be specified as fixed or be variable. Thereby, the second threshold value can also be specified by the manufacturer for a certain combination consisting of a sensor device and a pulse generator and/or for a certain crankshaft type. The second notification can furthermore comprise an optical and/or an acoustic signal. The second notification can temporally last until the change in the operating behaviour of the crank drive has been remedied or occur at regular limited time intervals. The second notification can occur in electronic form, for example, as a digital entry in a fault memory of the motor vehicle. The second notification can additionally give an indication that a fault of the crank drive is present, in particular, a crack in the crank drive or bearing wear. The second notification can give an indication that such a fault is on the verge of occurring, however, no immediate repair of the crank drive is required. The second notification can also give an indication that an immediate repair of the crank drive is required. As an alternative, the first notification can also be output if the difference according to the value of both signals $\Delta S=|S_{cur}-S_{ref}|$ exceeds the second threshold value $TV_2$. In turn, this can, above all, be the case if it has to do with a certain fault in the case of the reference state. During the course of a further generalization, other threshold values $TV_n$ can also be specified and, in the case of exceeding these threshold values, in turn, corresponding notifications can be output, whereby a multi-level warning procedure can be prepared in a favourable way.

In accordance with another further embodiment, the second notification gives an indication that, due to a fault of the crank drive, in particular, due to a crack in the crank drive or bearing wear, an immediate repair of the crank drive is required and the first notification gives an indication that such a fault is impending, however, no immediate repair of the crank drive is required. By means of this, a two-level warning procedure can be provided, which initially prewarns a user of a vehicle that an expected fault of the crank drive could occur in the near future and from this, damage could arise, which gives the user time to take corresponding measures for this case.

Another embodiment provides that the reference signal $S_{ref}$ of the sensor device is determined for a certain motor vehicle and is stored as a vehicle-specific reference signal $S_{ref}$ in the memory. Since the generated signal form and signal amplitude can slightly differ due to the manufacturing tolerances and/or variations of the installation position in every vehicle, the reliability and precision is increased due to the use of a vehicle-specific reference signal $S_{ref}$, with which changes to the crank drive can be detected. For this purpose, for a certain reference state of the crank drive, in particular, its new state, of a special motor vehicle, a rotational-speed-dependent measurement of the signal generated by the sensor device can take place, for example, after assembly of the motor vehicle, however, before its start-up. This signal, which contains the rotational-speed-dependent vibrational, positional and resonance behaviour of the crank drive in the installation geometry for this special motor vehicle, can then be saved as a reference signal for this special vehicle.

As an alternative, in the case of the reference signal $S_{ref}$ of the sensor device, it can have to do with a vehicle-nonspecific reference signal $S_{ref}$ of the sensor device. In the case that the installation position of the crank drive, the sensor device and the pulse generator scarcely differs for various motor vehicles, for example, for vehicles of the same model or the same series, in this way, an elaborate determination of a vehicle-specific reference signal $S_{ref}$ can be done without. For example, initially, the signal of the sensor device in a reference state of the crank drive can be determined for a motor vehicle, for example in a rotational-speed-dependent manner and this signal can be used as a reference signal for other vehicles of the same model.

In accordance with an embodiment, the method for detecting a change in the operating behaviour of a crank drive is carried out at regular time intervals and/or at certain mileages. In this way, the current signals $S_{cur}$ of the sensor device detected in this way are saved in a memory as trend data and, on request by a user, output. As trend data, data are understood, which have been detected by means of the same measurement process and then subjected to the same process steps, however, collected at different points in time. This makes a direct comparison of the data possible in order to easily detect systematic effects, for example, continuous wear of the crank drive. Thereby, it can be determined from these trend data if, in the case of a fault of the crank drive, it has to do with sudden and therefore unexpected damage or operation-related and therefore foreseeable wear of the crank drive. The time intervals can be even and therefore periodical or follow a certain order, however, without a fixed periodicity. For example, the time interval can be six months. Executing the method at certain mileages at fixed intervals can, for example, also take place every 5000 km or take place in accordance with a certain order, however without a fixed periodicity. For example, the mileage can be decreased up to a re-execution of the method with an increasing mileage of the vehicle in order to detect a fault becoming more likely due to the high running performance more reliably. The trend data can be output to the user optically and/or acoustically. Furthermore, the trend data can be provided to the user in electronic form, in particular, digital data.

According to an embodiment of the disclosure, in the case of the reference state of the crank drive, it has to do with a new state of the crank drive shortly after installing the crank drive, in particular, after installing the sensor device and the pulse generator, within the motor vehicle. This has the advantage that the crank drive has no signs of wear in this state and thereby, wear-related changes can be detected well during operation. The indication "shortly after assembly of the crank drive" is to be understood such that no other manufacturing-related changes are made to the installation position of the crank drive, in particular, to the position of the sensor device and pulse generator, however a start-up of the vehicle has still not taken place. "Shortly after installation of the crank drive" can comprise a time span up to a mileage of the vehicle amounting to 50 km.

As an alternative, in the case of the reference state, it has to do with a state of the crank drive shortly after a maintenance or repair of the crank drive. Since the modifications to the crank drive possibly performed during maintenance or repair can result in changes to the distance between the sensor device and pulse generator or to the rotational-speed-dependent vibrational, positional and resonance behaviour of the crank drive, it is favourable to carry out a re-calibration of the reference state in order to avoid fault diagnoses or fault notifications. For example, for this purpose, after maintenance or repair of the crank drive, the current signal of the sensor device can be detected depending on the rotational speed and be stored in the memory as a new reference signal. Also, in this case, the indication "shortly after maintenance or repair of the crank drive" is to be understood such that no other maintenance- or repair-related changes are made to the installation position of the crank drive, in particular, to the position of the sensor device and pulse generator, however a restart-up of the vehicle has still not taken place.

As an alternative, in the case of the reference state, it has to do with a fault or state of wear of the crank drive, in particular, with a crank drive with a crack in the crankshaft. This has the advantage that, if different faults or wear states of the crank drive result in a rotational-speed-dependent vibrational, positional and resonance behaviour of the crank drive characteristic of the respective fault or state of wear, these faults or states of wear can also be used as reference states in order to carry out a specific fault diagnosis. In addition, a plurality of reference states of the crank drive can also be stored in the memory and the comparison can be carried out for the plurality of stored reference states accordingly.

The disclosure further relates to a motor vehicle, in particular, a utility vehicle, with a crank drive, comprising a crankshaft, a pulse generator rotating during operation of the crankshaft and a stationary inductive sensor device, which generates a signal S dependent on the rotational speed of the pulse generator and the distance of the pulse generator away from the sensor device, and a control device, which is set up to receive the signals of the sensor device and to carry out a method for detecting a change in the operating behaviour of a crank drive, as is described in this document.

BRIEF DESCRIPTION OF THE DRAWINGS

The previously described embodiments and features of the disclosure can be combined with each other in any way. Other details and advantages of the disclosure are described in the following taking the enclosed drawing into account. The figures show.

DETAILED DESCRIPTION

Figure 1:
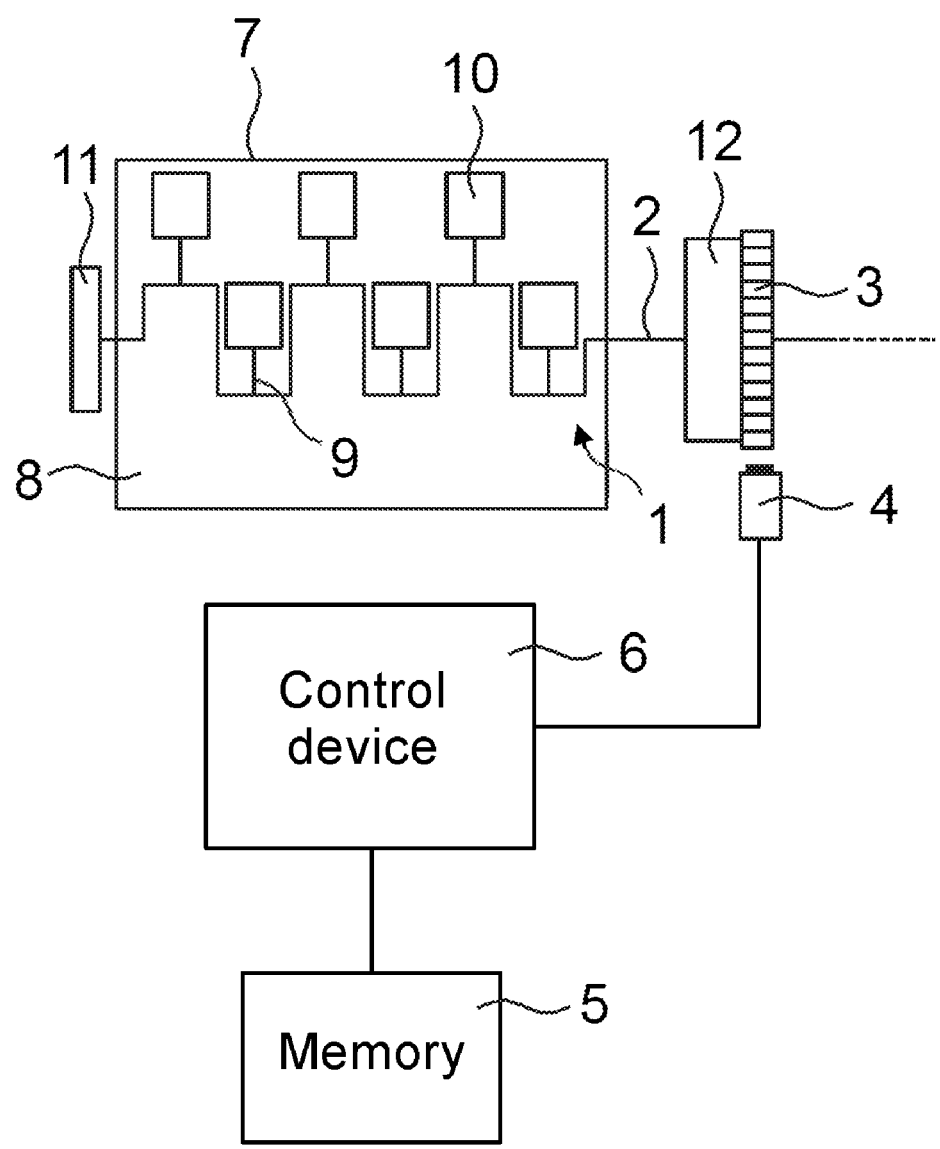
FIG. 1 depicts a schematic representation of a crank drive with a pulse generator and sensor device.

FIG. 1 schematically shows a crank drive 1 of a motor vehicle, in particular of a utility vehicle, which is, in itself, known. The crank drive 1 comprises a crankshaft 2, which is part of an internal combustion engine 8, which is only schematically shown as an engine block 7, as well as a plurality of connecting rods 9 and pistons 10 coupled to the crankshaft 2. Furthermore, just like the internal combustion engine 8, the crank drive 1 comprises other components, which are used in accordance with usual practice, in particular, counterweights, crankshaft bearings, seals, cylinders, injection system, etc. without these being explicitly shown in FIG. 1. The crankshaft 2 is arranged within the engine block 7 and guided out on both sides. A torsion vibration damper 11 is provided on an end of the crankshaft 2 guided out of the engine block 7. On an end lying opposite to this end of the crankshaft 2, the crank drive 1 comprises a flywheel 12, for example, a dual mass flywheel with a pulse generator 3 designed as a sensor wheel. Here, the sensor wheel has equidistant angular markings along its circumference, which can be designed as holes or projections. Adjacent to the sensor wheel—radial in the present embodiment, wherein an axial installation position would also be possible—a magnetic sensor device 4, for example, an inductive sensor device is provided which is suited to generating a signal S depending on the rotational speed of the pulse generator 3, as well as the distance between the sensor device 4 and the pulse generator 3. In particular, in the case of this signal S, it has to do with a voltage signal, which, in the case of the sensor device 4, is induced there due to the magnetic flux varying due to the movement of the pulse generator 3. In addition, a rotational speed of the crankshaft 2 can be determined from the detected signal S of the sensor device 4. For this purpose, between the distance of the angular markings on the sensor wheel and the corresponding crankshaft rotation, a fixed correlation can exist, whereby the rotational speed of the crankshaft 2 can be detected by the detection of the angular markings per time unit. In order to conclude operational changes of the crank drive 1, in the case of the method claimed, however, the "raw signal" of the magnetic sensor device 4, in particular, the voltage signal may be used and not the rotational-speed signal detected by means of the same sensor device 4, however processed by it. In the embodiment shown in FIG. 1, the signal S detected by the sensor device 4 is provided to a control device 6. Furthermore, the control device 6 is connected to a memory 5, on which a reference signal $S_{ref}$ of the sensor device 4 is stored.

Figure 2:
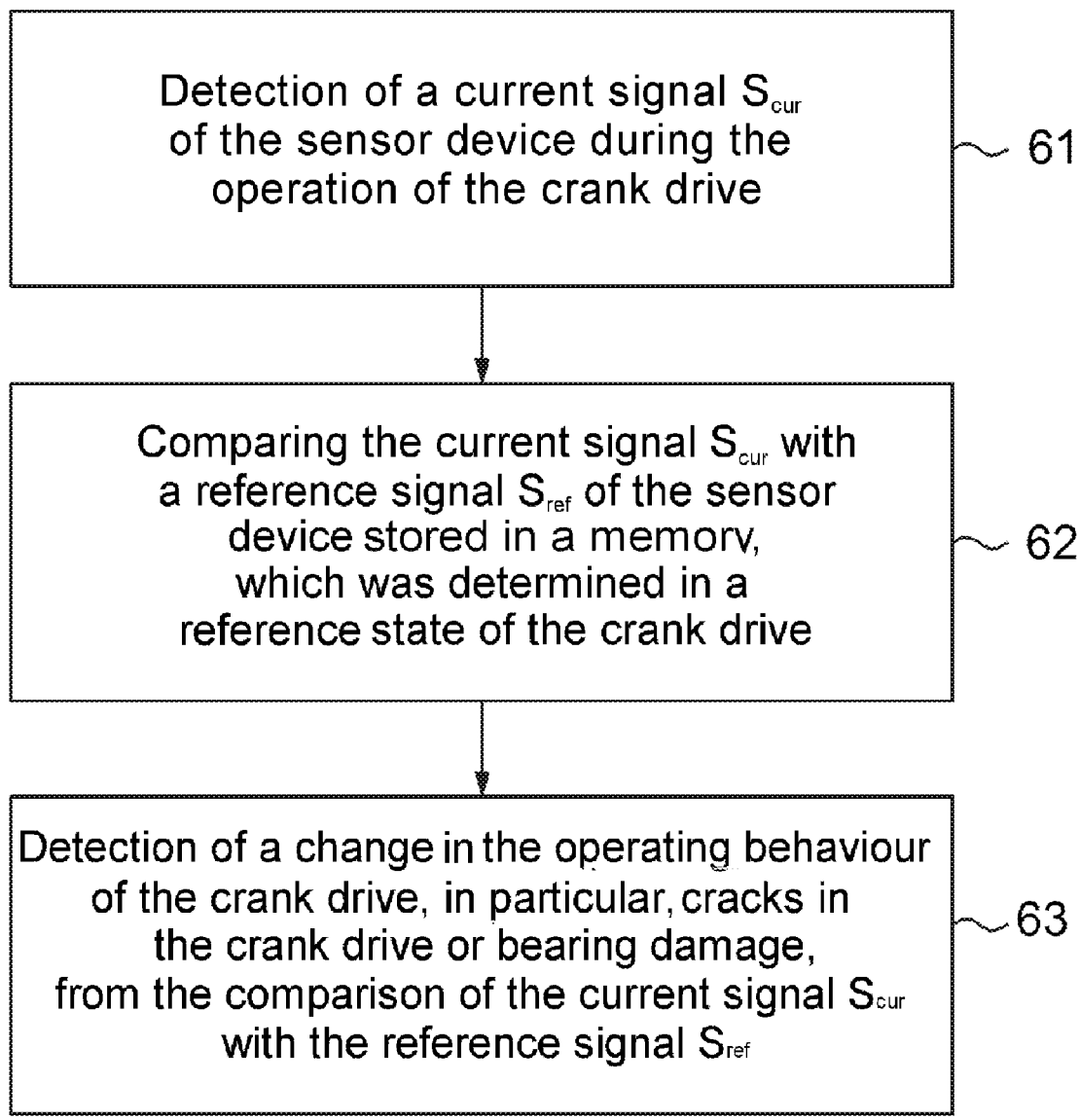
FIG. 2 depicts a method for detecting a change in the operating behaviour of a crank drive of a motor vehicle in accordance with an embodiment of the disclosure.

In FIG. 2, a flowchart of a method for detecting a change in the operating behaviour of a crank drive 2 of a motor vehicle in accordance with an embodiment of the disclosure is shown. At step 61, a current signal $S_{cur}$ of the magnetic sensor device 4 is detected during the operation of the crank drive 1. For example, in the case of the current signal $S_{cur}$ of the sensor device 4, it can have to do with a voltage signal, in particular, an analogue voltage signal, which, in the case of the sensor device 4, is induced there due to the magnetic flux varying due to the movement of the pulse generator 3. At step 62, the current signal $S_{cur}$ of the sensor device 4 is compared with a reference signal $S_{ref}$ of the sensor device 4 stored in a memory 5, wherein the reference signal $S_{ref}$ of the sensor device 4 has been determined in a reference state of the crank drive 1. In order to compare the signals, a time-averaged maximal voltage signal or a time-averaged value of the voltage signal can also be determined from the detected current voltage signal. At step 63, a detection then takes place of changes in operating behaviour of the crank drive 1, in particular, detection of cracks in the crank drive 1 or bearing wear, from the comparison of the current signal $S_{cur}$ with the reference signal $S_{ref}$ of the sensor device 4. If a change was detected, this can be notified to a user of the motor vehicle via optical and/or acoustical signals and/or a notification in the fault memory of the vehicle.

Figure 3:
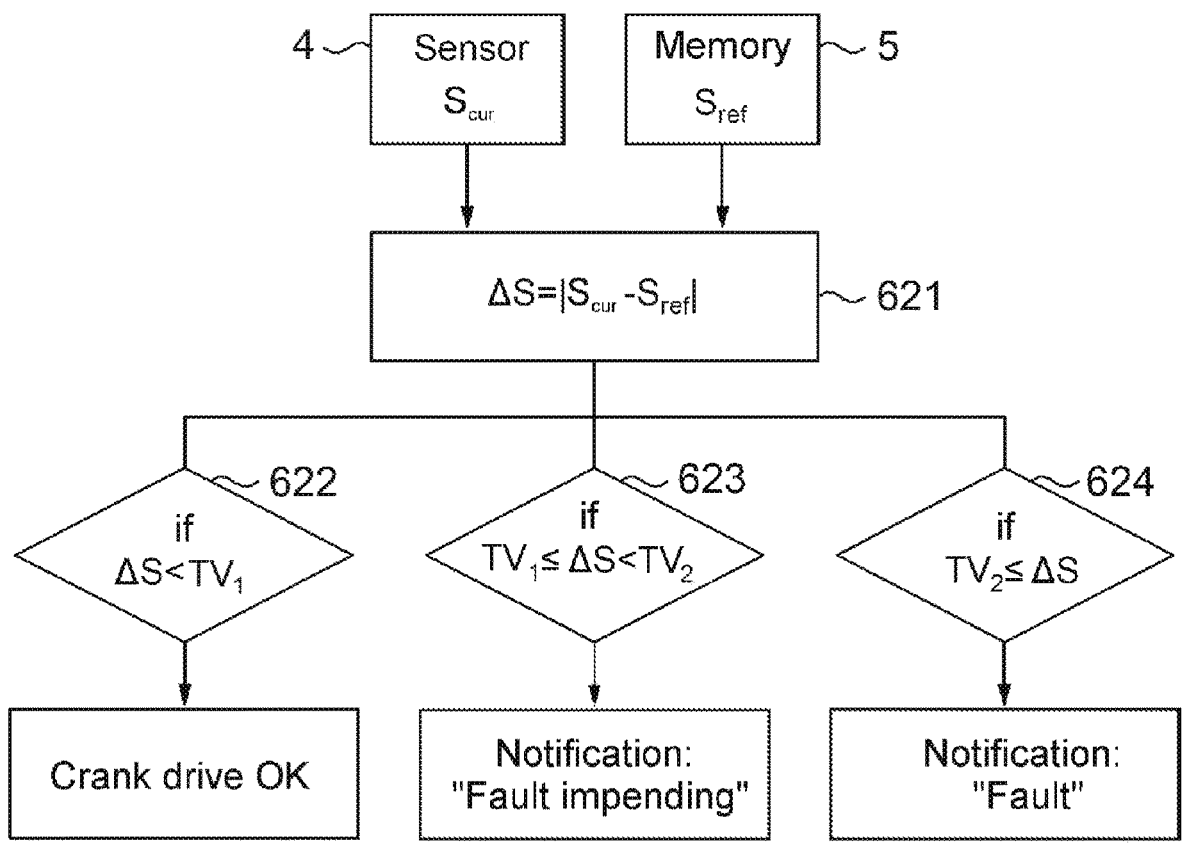
FIG. 3 depicts a comparison of the current signal $S_{cur}$ with a reference signal $S_{ref}$ of the sensor device in accordance with an embodiment of the disclosure.

FIG. 3a shows a flowchart of a method for comparing a current signal $S_{cur}$ of the sensor device with a reference signal $S_{ref}$ according to step 62 in FIG. 2 in accordance with an embodiment of the disclosure. For this purpose, the difference according to the value $\Delta S=|S_{cur}-S_{ref}|$ is formed from the current signal $S_{cur}$ detected by the sensor device 4 and the reference signal $S_{ref}$ stored in the memory 5 at step 621. Different operations are carried out depending on the value of this factor $\Delta S$ in comparison to different specified threshold values $TV_1$ and $TV_2$, wherein $TV_1<TV_2$ applies. A certain range is defined above the threshold values, in which the position of the pulse generator to the sensor device can deviate from its target position. If the value of $\Delta S$ is under a first threshold value $TV_1$ (step 622), the crank drive is OK and possible changes in the operating behaviour with relation to a reference state, for example, the new state of the crank drive, are within the tolerance range ($TV_1$). If $TV_1 \leq \Delta S<TV_2$ applies, the notification is output to the user that a "fault of the crank drive is impending" at step 623. That means, changes, for example, signs of wear, in the operating behaviour of the crank drive have occurred, which are greater than a first tolerance range ($TV_1$), however still are not severe enough that a fault exists that hinders an onward journey. Thereby, the possibility is given to the user to take appropriate measures or to change his/her driving behaviour. In contrast, if the case occurs that $TV_2 \leq \Delta S_1$ at step 624, a notification is output that "there is a fault in the crank drive", which hinders an onward journey and requires immediate repair.

Figure 4:
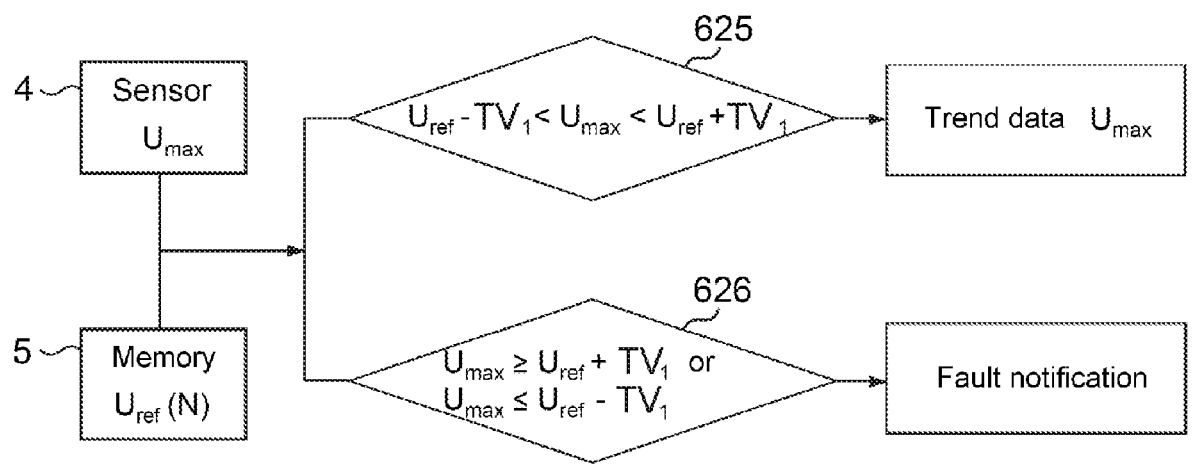
FIG. 4 depicts a comparison of a time-averaged maximum voltage signal $U_{max}$ of the sensor device with a reference voltage signal $U_{ref}$ in accordance with another embodiment of the disclosure.

In FIG. 4, the comparison of the signals is shown according to another embodiment of the disclosure. In this case, it has to do with a time-averaged maximum voltage signal value $U_{max}$, which was determined from the current signal detected by the sensor device 4 depending on the crankshaft rotational speed. In the memory 5, additionally, corresponding reference voltage signal values $U_{ref}(N)$ are stored as a function of the rotational speed N of the crankshaft 2. By means of comparing of the voltage signal value $U_{max}$ depending on the rotational speed with the reference voltage signal value $U_{ref}$ corresponding to this rotational speed, in turn, a possible change in the operating state of the crank drive 2 can be determined. If, namely, at step 625, it is determined that $U_{ref}-TV_1 < U_{max} < U_{ref}+TV_1$ applies, no malfunction of the crank drive 1 is present, meaning the average distance between the pulse generator 3 and the sensor device 4 is in a defined tolerance range beyond the threshold value $TV_1$. The determined voltage signal value $U_{max}$ is then stored in the memory 5 as a data point for a trend data analysis and can be output to a user on request. However, if, at step 626, it is determined that $U_{max} \geq U_{ref}+TV_1$ or $U_{max} \leq U_{ref}-TV_1$ applies, a change in the operating behaviour of the crank drive 1 is present, which lies outside of the tolerance range. For example, a crack in the crank drive 1 is present, whereby its vibrational behaviour and thereby the average distance between the pulse generator 3 and the sensor device 4 have changed accordingly. A user is informed of this fault of the crank drive 1 by means of a corresponding fault notification.

Figure 5:
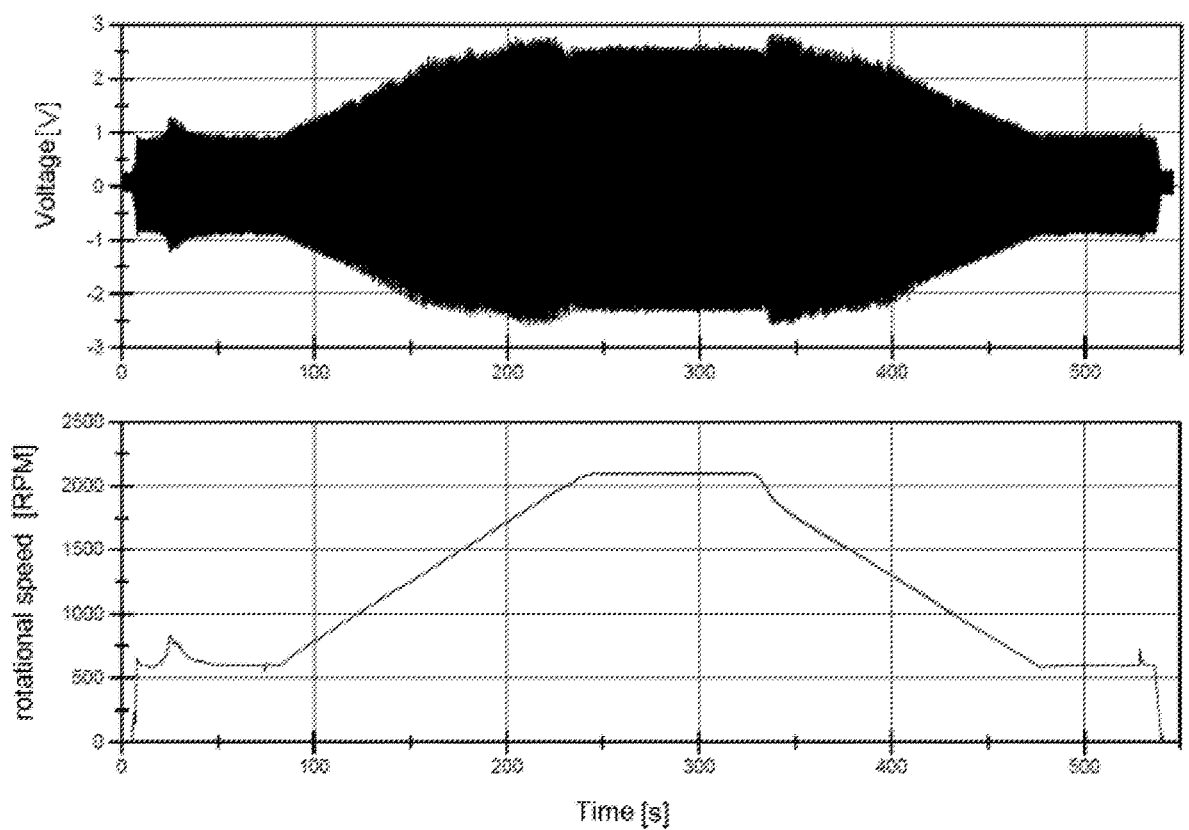
FIG. 5 depicts a voltage signal generated by an inductive sensor device as a function of the time at different rotational speeds of the crankshaft.

FIG. 5 shows, as an example, the voltage signal S of an inductive sensor device 4 which has been detected in the case of different rotational speeds of the crankshaft 2. The signal S referenced with the reference number 41 corresponds to the oscillating rotational-speed-dependent voltage signal S of the sensor device 4, wherein, due to the compression of the signal, the individual oscillations cannot be resolved and thereby, only the maximum/minimum values can be read in the form of an enveloping curve. The corresponding voltage values are indicated on the left axis. The graph referenced with the reference number 42 thereby shows the corresponding rotational speed of the crankshaft 2, wherein the rotational-speed values are indicated on the right axis. It is shown that the maximum amplitude of the oscillating signal S correlates with the rotational speed. This rotational-speed-dependent signal progression 41 is thereby characteristic for a certain installation position and an operational state of the crank drive 1 and thereby, in accordance with the claimed method, can be used to detect changes in the operating state of the crank drive 1. For example, the rotational-speed-dependent progression shown in FIG. 5 could be stored as a reference signal for this reference state of the crank drive 1.

Although the disclosure has been described making reference to exemplary embodiments, it is apparent to the person skilled in the art that different changes can be carried out and equivalents can be used as a substitute without abandoning the scope of the disclosure. Consequently, the disclosure should not be limited to the disclosed exemplary embodiments but should comprise all exemplary embodiments that fall into the area of the enclosed disclosure.

REFERENCE LIST 1 crank drive
2 crankshaft
3 pulse generator
4 magnetic sensor device
5 memory
6 control device
7 engine block
8 internal combustion engine
9 connecting rod
10 piston
11 torsional vibration dampers
12 flywheel

I claim:

1. A method for detecting a change in the operating behaviour of a crank drive of a motor vehicle, wherein the crank drive includes a crankshaft, a pulse generator rotating during operation of the crankshaft and a stationary magnetic sensor device, which generates a signal S dependent on the rotational speed of the pulse generator and the distance of the pulse generator away from the sensor device, the method comprising:
  i. detection of a current signal $S_{cur}$ of the sensor device during the operation of the crank drive, wherein a measurement for the current distance between the pulse generator and sensor device can be derived from the current signal $S_{cur}$ of the sensor device,
  ii. comparison of the current signal $S_{cur}$ with a reference signal $S_{ref}$ of the sensor device stored in a memory, which has been determined in a reference state of the crank drive, and
  iii. detecting a change in the operating behaviour of the crank drive from the comparison of the current signal $S_{cur}$ with the reference signal $S_{ref}$.

2. The method according to claim 1 in particular, wherein the detected in the operating behaviour is indicative of cracks in the crank drive or bearing wear.

3. The method according to claim 1, wherein the signal S generated by the sensor device is a voltage signal.

4. The method according to claim 3, wherein $S_{cur}$ is a time-averaged maximal voltage signal, or a time-averaged value of the voltage signal is determined.

5. The method according to claim 1, wherein the detected current signal $S_{cur}$ of the sensor device is subjected to a filtering and after the filtering a measurement for the current average distance between the pulse generator and the sensor device can be derived from the current signal $S_{cur}$.

6. The method according to claim 1, wherein based on the comparison of the current signal $S_{cur}$ with the reference signal $S_{ref}$,
  a) a deviation of the current distance between the pulse generator and the sensor device from a distance between the pulse generator and the sensor device in a reference state of the crank drive, or
  b) a crack in the crank drive or bearing wear is detected.

7. The method according to claim 1 wherein a rotational speed of the crankshaft is determined from the detected current signal $S_{cur}$ of the sensor device.

8. The method according to claim 1, wherein the reference signal $S_{ref}$ of the sensor device is stored in the memory as a function of the rotational speed of the crankshaft or of the torque of the crankshaft and that the comparison occurs by means of comparing a signal value of the current signal $S_{cur}$, which has been detected at a certain rotational speed or torque of the crankshaft with a reference signal value of the corresponding rotational speed or of the corresponding torque.

9. The method according to claim 1 wherein the current signal $S_{cur}$ of the sensor device is determined as a function of the rotational speed of the crankshaft or of the torque of the crankshaft.

10. The method according to claim 1, wherein the comparison of the current signal $S_{cur}$ of the sensor device with the reference signal $S_{ref}$ of the sensor device stored in the memory is carried out by forming a difference of both signals $\Delta S=|S_{cur}-S_{ref}|$ according to the value and a first notification is output if the difference of both signals $\Delta S$ according to the value exceeds a first threshold value $TV_1$.

11. The method according to claim 10, wherein a second notification is output if the difference of both signals $\Delta S$ according to the value exceeds a second threshold value $TV_2$, wherein $TV_2 > TV_1$ applies.

12. The method according to claim 11, wherein the second notification gives an indication that, due to a fault of the crank drive or bearing wear, an immediate repair of the crank drive is required, and the first notification gives an indication that such a fault is impending, however, no immediate repair of the crank drive is required.

13. The method according to claim 12, wherein the second notification is due to a crack in the crank drive.

14. The method according to claim 1 wherein the reference signal $S_{ref}$ of the sensor device is determined for a certain motor vehicle and is stored as a vehicle-specific reference signal $S_{ref}$ in the memory or is a vehicle-nonspecific reference signal $S_{ref}$ of the sensor device.

15. The method according to claim 1, wherein the detection of a change in the operating behaviour of a crank drive is carried out at regular time intervals or at certain mileages and the current signals $S_{cur}$ of the sensor device determined in this manner are saved in a memory as trend data and, on request by a user, are output.

16. The method according to claim 1 wherein the reference state of the crank drive is associated with the state of the crank drive shortly after installation of the crank drive within the motor vehicle or is associated with the state of the crank drive shortly after maintenance or repair of the crank drive.

17. The method according to claim 16, wherein the reference state of the crank drive associated with the state of the crank drive shortly after installation is associated with installation of the sensor device and the pulse generator.

18. A motor vehicle, comprising:
a crank drive, including a crankshaft;
a pulse generator rotating during operation of the crankshaft;
a stationary magnetic sensor device, generating a signal S dependent on the rotational speed of the pulse generator and the distance of the pulse generator away from the sensor device; and
a control device, configured to receive the signals of the sensor device and to carry out a method for detecting a change in the operating behaviour of a crank drive, wherein the method includes:
i. detection of a current signal $S_{cur}$ of the sensor device during the operation of the crank drive, wherein a measurement for the current distance between the pulse generator and sensor device can be derived from the current signal $S_{cur}$ of the sensor device,
ii. comparison of the current signal $S_{cur}$ with a reference signal $S_{ref}$ of the sensor device stored in a memory, which has been determined in a reference state of the crank drive, and
iii. detecting a change in the operating behaviour of the crank drive from the comparison of the current signal $S_{cur}$, with the reference signal $S_{ref}$.

19. The motor vehicle of claim 18, wherein the motor vehicle is in the form of a utility vehicle.

* * * * *